PHOTOMICROGRAPHS OF PRECIPITATES OBTAINED BY AMMONIATION
TO pH 8.5 OF SUPERPHOSPHORIC ACID AT ATMOSPHERIC PRESSURE

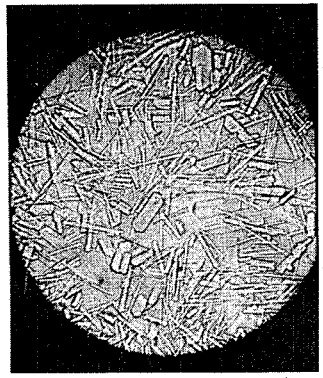 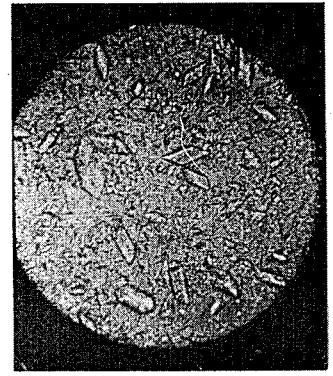

100 |———| MICRONS

READILY FILTERABLE
PRECIPITATE, ROD CRYSTALS
OF $(NH_4)_4P_2O_7 \cdot H_2O$ AND
PLATES OF $(NH_4)_2HPO_4$.
AMMONIATED AT 15° TO 20°C.

POORLY FILTERABLE
PRECIPITATE, SMALL PLATE
CRYSTALS OF $(NH_4)_4P_2O_7$
AND PRISMS OF $(NH_4)_2HPO_4$.
AMMONIATED AT 35° TO 70°C.

Fig. 3

Thad D. Farr
Julius D. Fleming   INVENTORS.
BY Robert A. Petruela
        agent

United States Patent Office

3,533,737
Patented Oct. 13, 1970

1

3,533,737
AMMONIUM POLYPHOSPHATE PRODUCED AT
ATMOSPHERIC PRESSURE
Thad D. Farr, Sheffield, and Julius D. Fleming, Florence, Ala., assignors to Tennessee Valley Authority, a corporation
Original application Aug. 24, 1967, Ser. No. 663,171, now Patent No. 3,484,192, dated Dec. 16, 1969. Divided and this application Nov. 26, 1968, Ser. No. 779,665
Int. Cl. C01b 25/28, 25/38
U.S. Cl. 23—107                                                       3 Claims

ABSTRACT OF THE DISCLOSURE

Process wherein 70 percent $P_2O_5$ (plus) polyphosphoric acids are treated with ammonia and water at atmospheric pressure. A significant portion of the $P_2O_5$ in the starting acid is precipitated at intermediate pH's and removed as ammonium ortho- and pyrophosphates. The solution phase is ammoniated to higher pH's to precipitate mostly tetraammonium pyrophosphate and diammonium orthophosphates. The intermediate and terminal slurries may be granulated with recycle acid and dried to produce final granular products or may be treated to yield (1) a moist solid phase that ultimately produces granular products and (2) a solution phase that may be recycled, used as a liquid, or treated to a more concentrated solution.

---

The invention herein described may be manufactured and used by or for the Government for governmental purposes without the payment to us of any royalty therefor.

This application is a division of application Ser. No. 663,171, filed Aug. 24, 1967 now Pat. No. 3,484,192.

Our invention relates to an improved process for the production of high-analysis ammonium polyphosphate salts and solutions and more particularly to the preparation of ammonium acyclic polyphosphate salts and solutions by the ammoniation of superphosphoric acid at atmospheric pressure.

The term "superphosphoric acid" used in the specification and claims is defined as a mixture of ortho-, pyro-, and higher condensed phosphoric acids with the general formula $H_{n+2}P_nO_{3n+1}$. The distribution of the acid species varies with the $P_2O_5$ content of the superphosphoric acid. The Canadian Journal of Chemistry, vol. 34 (1956), p. 790, shows that superphosphoric acid in the range 69.81 to 84.95 percent $P_2O_5$ contains the following proportions of ortho-, pyro-, and higher condensed acyclic polyphosphoric acids, expressed as percent of total phosphorus.

97.85 to 2.32 percent ortho-
2.15 to 49.30 percent pyro-
0.00 to 24.98 percent tripoly-
0.00 to 16.99 percent tetrapoly-
0.00 to 12.64 percent pentapoly-
0.00 to 9.75 percent hexapoly-
0.00 to 8.63 percent heptapoly-
0.00 to 7.85 percent octapoly-
0.00 to 6.03 percent nonapoly-
0.00 to 29.41 percent higher polymers.

Acids of the above type are available from commercial sources of electric-furnace superphosphoric acid plants and may be produced with $P_2O_5$ contents ranging from

2 about 74 to about 83 percent by a process described in U.S. Pat. 3,015,540, Striplin.

Our invention is especially valuable in the production of solid and liquid ammonium polyphosphates by the atmospheric ammoniation of superphosphoric acid of any practical $P_2O_5$ content higher than about 70 percent. Either electric-furnace acid or concentrated wet-process acid can be used. If concentrated wet-process phosphoric acids are desired, they can be produced by concentrating ordinary merchant-grade wet-process phosphoric acid containing approximately 54 weight percent $P_2O_5$ and also containing incidental metallic impurities ranging from about 1 to 10 percent by a dehydration process to remove water from the merchant-grade wet-process phosphoric acid and increase its $P_2O_5$ content up into the wet acid super range of about 60 percent to about 80 percent $P_2O_5$ by a process such as that described in the copending application Ser. No. 835,377, Getsinger, assigned to the assignee of the present invention, and also described in U.S. Pat. 3,192,013. When using such wet-process phosphoric acid, the distribution of the acid species therein has been observed to be somewhat different from that which would result if highly concentrated substantially pure furnace acid were used.

Heretofore a method for the production of ammonium polyphosphate has been described in U.S. Pats. 3,171,733 and 3,228,752, Hignett et al. In this prior process, superphosphoric acid, either wet-process or electric-furnace type, is treated with gaseous ammonia in a reactor under a pressure of about 25 to about 1000 p.s.i.g. and a temperature of 365° to 450° F., the molten material is discharged from the reactor and is granulated by mixing with recycle fines in a pugmill, and the granules are cooled and then screened to separate particles of the desired size for product. The products had compositions ranging from 12.9 to 18.3 percent N and 59.2 to 64.2 percent $P_2O_5$, which corresponds to a degree of ammoniation ranging from 4.9 to 7.5 pounds $NH_3$ per unit (20 pounds) $P_2O_5$. The product is composed of two major phases, monoammonium orthophosphate and triammonium pyrophosphate, and a minor phase diammonium pyrophosphate; the phosphate is divided about equally between ortho and non-ortho forms. Some of the products from this pressure process, however, have had some outstanding disadvantages. It has a relatively low degree of ammoniation as compared to 9.6 pounds $NH_3$ per unit $P_2O_5$ in diammonium orthophosphate or in tetraammonium pyrophosphate. Another disadvantage is that it will cake in storage unless conditioned; the caking characteristics have been attributed to the instability of one of its major phases.

Another method for preparing solid ammonium phosphates of unspecified distribution of phosphate species by ammoniating concentrated wet-process orthophosphoric acid ($P_2O_5$ content between 68.6 and 80 percent) at 70° C. to 225° C. to provide at least 0.14 part N per part P is described in U.S. Pats. 3,241,946 and 3,243,279, D. C. Young. Young states: "The exact nature of the ammonium phosphate products is not known with certainty. It is believed, however, that the major proportion of the product is a mixture of ammonium orthophosphates and ammonium polyphosphates with the presence of some P–N bonds, e.g., phosphoamido and phosphoimido compounds." Young does not specify how acid concentration, temperature, pH, and water content affect the distribution of phosphate species in such products, whereas, in the present application we do specify and give examples of the effects of acid concentration, temperature, pH, and water content on the distribution of phosphate species in the solid products obtained. Furthermore, Young does not teach, as we do, how these process variables may be controlled to obtain solid products with a high degree of ammoniation and with a desirable combination of orthophosphate and condensed phosphates.

It is therefore an object of the present invention to provide a process wherein superphosphoric acid containing more than about 74 percent $P_2O_5$ is treated with ammonia and water at atmospheric pressure to prepare an intermediate aqueous slurry of ammonium phosphates at pH about 8 which is filtered or centrifuged to yield (1) a solution phase that is recycled to first stage, and (2) a moist solid phase that is then granulated and dried to produce final granular products which contain all the $P_2O_5$ that was in the starting acid, which have relatively high ratios of N to $P_2O_5$, which contain mostly diammonium ortho- and tetraammonium pyrophosphates, and which have good handling and storage properties.

Another object of the present invention is to provide such process to produce both granular ammonium polyphosphate and a concentrated solution with each product containing about half the $P_2O_5$ that was in the starting acid, with (1) the solid phase having a high ratio of N to $P_2O_5$ and containing chiefly diammonium ortho- and tetraamonium pyrophosphates, and which has good handling and storage properties; and (2) the untreated solution phase having a high total content of N and $P_2O_5$.

A further object of the present invention is to provide such process to produce such solid and liquid phases, but in which a significant portion of the $P_2O_5$ present in the acid is precipitated at various intermediate pH's and removed as ammonium ortho- and pyrophosphates in various proportions, and the resulting solution phase is then ammoniated further to higher pH's to precipitate mostly tetraammonium pyrophosphate and diammonium orthophosphate.

Another object of the present invention is to provide such process wherein superphosphoric acids containing $P_2O_5$ in the range of about 70 to about 80 percent are treated with ammonia and water at atmospheric pressure to prepare intermediate aqueous slurries at pH about 8 that are granulated with recycle and dried to produce final granular products which contain all the $P_2O_5$ that was in the starting acid, which have relatively high ratios of N to $P_2O_5$, which contain mostly ammonium ortho-, pyro-, and tripolyphosphates, and which have good handling and storage properties.

A still further object of the present invention is to provide such processes for the production of salts and/or solutions from electric-furnace superphosphoric acids for use as fertilizers, or these products may preferably be considered as high-purity intermediates for special use such as inorganic builders in detergent formulations, as reagant chemicals, as medicinal and dental preparations, etc.

Another object of the present invention is to provide a process whereby impure superphosphoric acids such as concentrated wet-process phosphoric acids are ammoniated at atmospheric pressure to produce high-analysis products that may preferably be used as a fertilizer.

Still further and more general objects and advantages of the present invention will appear from the more detained description set forth, it being understood, however, that this more detailed description is given by way of illustration and explanation only and not by way of limitation, since various changes therein may be made by those skilled in the art within departing from the spirit and scope of the present invention.

In carrying out the objects of our invention in but several preferred forms thereof, we provide for the ammoniation of superphosphoric acids at atmospheric pressure to proceed in one or more stages and the resulting intermediate slurries are subsequently treated in various ways to produce (1) granules of ammonium polyphosphates which contain all the $P_2O_5$ that was originally present in the starting acid, (2) granules of ammonium polyphosphates and a concentrated liquid each of which may contain about 50 percent of the $P_2O_5$ that was originally present in the starting acid, (3) solutions which contain all the $P_2O_5$ that was originally present in the starting acid, or (4) suspensions which contain all the $P_2O_5$ that was originally present in the starting acid. The number of processing steps depends on the kind and composition of the superphosphoric acid that is used, and by the product that is desired, as will be disclosed in the subsequent detailed description.

Our invention, together with further objects and advantages thereof will be better understood from a consideration of the following descriptions taken in connection with the accompanying drawings in which.

FIG. 3 is a depiction of what is found in photomicrographs showing the relationship between the filterability of the slurries formed at high pH's and the temperature at which the precipitation of the ammonium phosphate occurs and illustrates that the precipitates which were formed at temperatures lower than about 20° C. exhibited quite satisfactory filtering characteristics, whereas the precipitates which were formed at temperatures above about 35° C. exhibited rather poor filtering characteristics.

MODIFICATION I—FIG. 2

Figure 1:
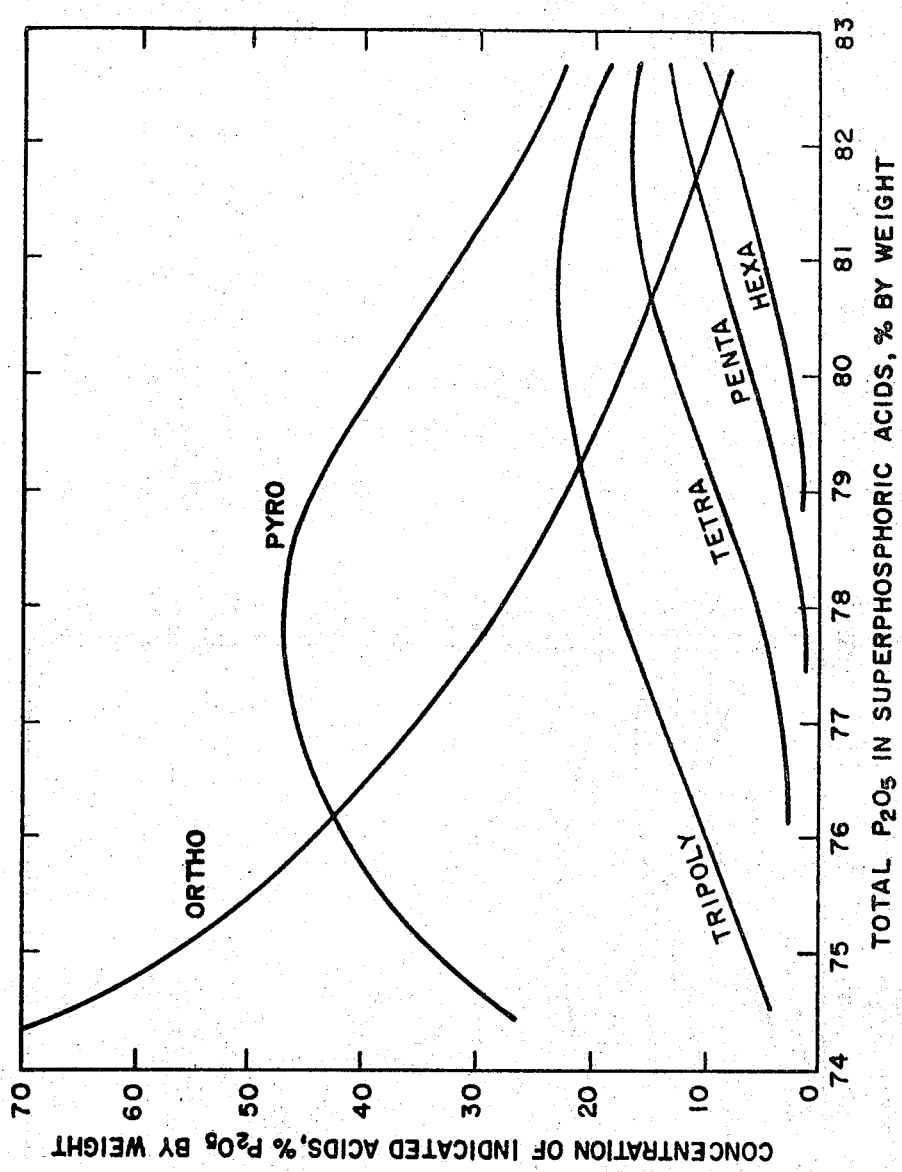
FIG. 1 is a graphical illustration showing the distribution of the principal acid species in commercially available electric-furnace superphosphoric acids which were used in the development of our process.
Figure 2:
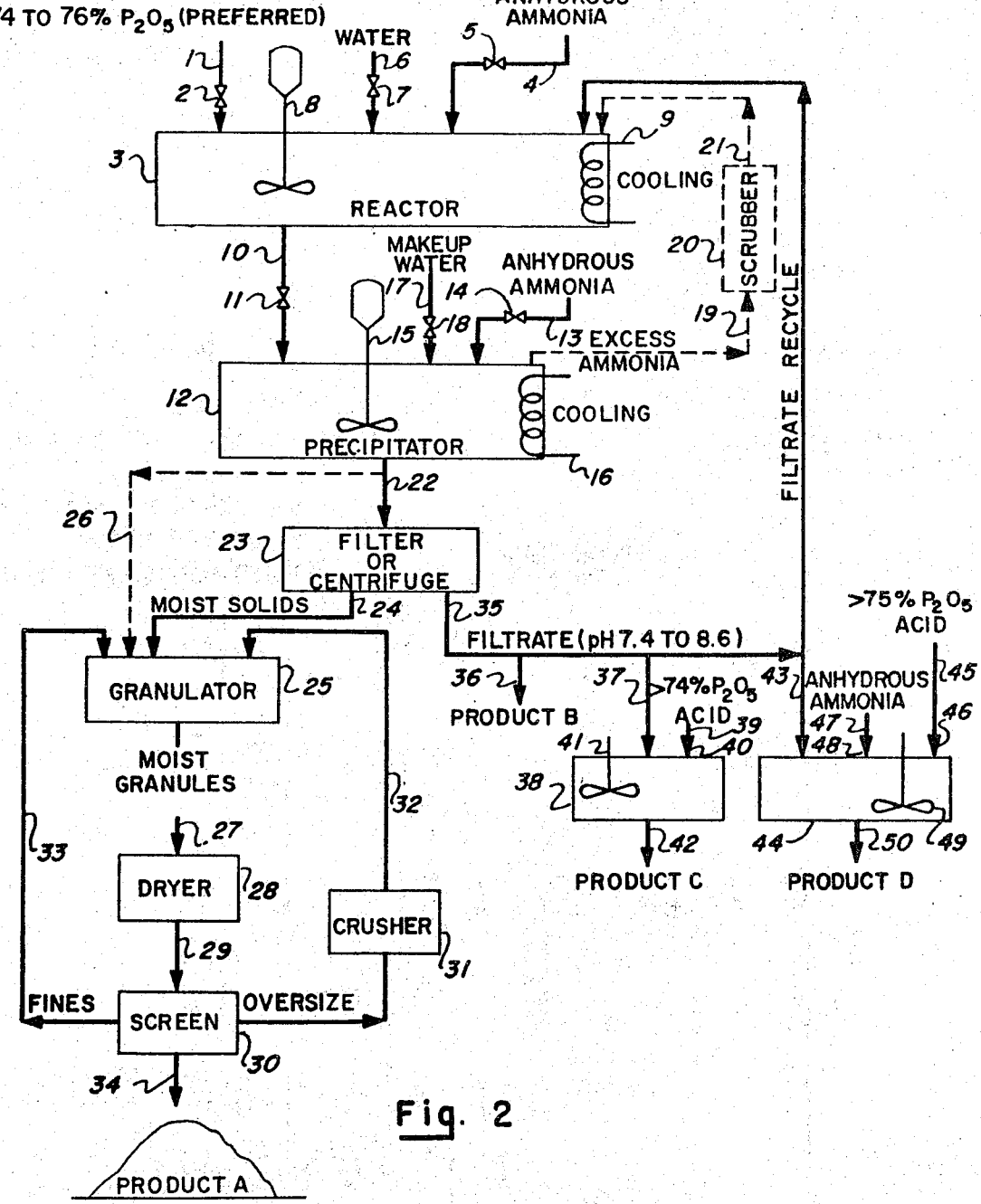
FIG. 2 is a flowsheet generally illustrating the principles of our process in modification I thereof, which results ultimately in the production of the desired high-analysis granular ammonium polyphosphates and solutions by the atmospheric-pressure ammoniation of superphosphoric acid preferably containing less than about 80 percent $P_2O_5$.

Referring now more specifically to FIG. 2, in this modification of our process for the preparation of ammonium polyphosphates by the atmospheric ammoniation of superphosphoric acids, superphosphoric acid containing preferably from about 74 to 76 percent $P_2O_5$ from a source not shown is fed through line 1 and any suitable means 2 for controlling the rate of flow into a reaction vessel 3. Anhydrous ammonia from a source not shown is fed into vessel 3 through line 4 and means 5 for controlling the rate of flow. Water from a source not shown is fed into vessel 3 through line 6 and means 7 for controlling the rate of flow. Vessel 3 is equipped with a pH meter not shown and a motor-driven agitator 8 running at such speed as to obtain rapid and intimate mixing of acid, water, and ammonia. The three reactants are added simultaneously and at such rates as to form an intermediate solution with pH in the range from about 5 to about 7 and which will contain more than about 33 weight percent total $(N+P_2O_5)$. Vessel 3 is equipped also with cooling coils 9 to control the temperature of the solution in the temperature range of about 50° to about 80° C. Under these conditions, hydrolysis of the nonortho species in the starting acid is minimized and the distribution of the phosphate species in the solution is similar to that in the acid. We prefer to introduce the superphosphoric acid and water at fixed rates according to the capacity of the equipment and to vary the rate of introduction of anhydrous ammonia as may be necessary to maintain the desired pH of the resultant solution.

The solution is discharged from reaction vessel 3 through line 10 and any suitable means 11 for controlling the rate of flow to precipitation vessel 12. Anhydrous ammonia from a source not shown is fed into vessel 12 through line 13 and means 14 for controlling the rate of flow. Precipitation vessel 12 is equipped with a pH meter not shown and a motor-driven agitator 15 running at such speed as to obtain rapid and intimate mixing of the anhydrous ammonia and the solution from reactor 3. The solution from reactor 3 and anhydrous ammonia are added simultaneously at such rates to maintain a slurry in the pH range of about 7.4 and 8.9 and a gross composition of more than about 45 weight percent total (N+$P_2O_5$), or preferably about 13 to about 16 percent N and about 35 to about 42 percent $P_2O_5$. We prefer to introduce the solution from vessel 3 to vessel 12 at a steady rate according to the capacity of the equipment and to vary the rate of introduction of anhydrous ammonia as may be necessary to maintain the desired pH of the resultant slurry and to have an average retention time in excess of about 5 minutes. As indicated in FIG. 2, precipitation vessel 12 may be equipped with cooling coils 16 to control the temperature of the slurry to about 20° C., a temperature that favors the formation of a readily filterable slurry. Alternately, this precipitation step may be done without refrigeration, in which case the slurry temperature may range from about 50° C. to 110° C. Water may be added via line 17 and means of control 18 to adjust the viscosity and to maintain the water content of the hot slurry in the range of about 20 to about 47 percent. The unreacted ammonia from precipitation vessel 12 is recycled to reactor 3 via line 19, scrubber 20, and line 21.

The slurry from precipitation vessel 12 is discharged through line 22 to a filter or centrifuge 23 to separate the liquid and solid phases (chiefly diammonium orthophosphate and tetraammonium pyrophosphate monohydrate), and the moist filter cake is discharged through line 24 into granulator 25 where it is mixed with recycle fines. In an alternate step, the slurry from precipitation vessel 12 is discharged through line 26 into granulator 25 where it is mixed with recycle fines. The granules containing about 1 to 8 percent free water from granulator 25 are fed through line 27 into a dryer 28 operated in the temperature range of about 50° C. to about 110° C. The dry granules travel via line 29 to a screening means generally illustrated as screens 30 and crusher 31. The crushed oversize material and the fine material are returned to granulator 25 via lines 32 and 33, respectively. The granular product (product A), discharged through line 34 to storage, will contain about 17 to about 21 percent N and about 52 to about 60 percent $P_2O_5$, and will consist mostly of ammonium ortho-, pyro-, and tripolyphosphates; the ratio of N to $P_2O_5$ and the distribution of phosphate species depend upon the composition of the acid and the processing conditions used.

The filtrate from vessel 23 containing about half the $P_2O_5$ in the starting acid is withdrawn via line 35 and returned to reactor 3 to furnish part of the water, $P_2O_5$, and ammonia required. Alternately, the filtrate from vessel 23 is withdrawn through lines 35 and 36 for use as a solution (product B) with a composition of about 9 to about 12 percent N and about 29 to about 34 percent $P_2O_5$. In another alternative step, the filtrate from vessel 23 is withdrawn through lines 35 and 37 to mixing tank 38 where its $P_2O_5$ content is adjusted by adding superphosphoric acids containing more than about 74 percent $P_2O_5$ from a source not shown through line 39 and any suitable means 40 for controlling the rate of flow. Mixing tank 38 is equipped with a pH meter not shown and a motor-driven agitator 41 running at such speed as to obtain rapid and intimate mixing of the filtrate and acid to form another solution (product C) with a selected pH lower than that in the filtrate. Product C containing about 29 to about 37 percent $P_2O_5$ is withdrawn from mixing tank 38 through line 42 to storage. In still another alternative step, the filtrate from vessel 23 is withdrawn through lines 35 and 43 to mixing tank 44. Superphosphoric acid (> about 75 percent $P_2O_5$) from a source not shown is added to mixing tank 44 through line 45 and any suitable means 46 for controlling the rate of flow to lower the pH down to a range of about 4 to about 5.5. Anhydrous ammonia from a source not shown is added to mixing tank 44 through line 47 and any suitable means 48 for controlling the rate of flow. Mixing tank 44 is equipped with a pH meter not shown and a motor-driven agitator 49 running at such speed as to obtain rapid and intimate mixing of the filtrate from vessel 23, acid, and ammonia to form a solution (product D) which is withdrawn via line 50 to storage. Product D will have a pH ranging from about 4.5 to about 7 and a composition ranging from about 10 to about 13 percent N and about 36 to about 40 percent $P_2O_5$, and which will not precipitate at storage temperatures even as low as 0° C.

In developing this modification of our process to prepare aqueous ammonium phosphate slurries with pH's higher than about 8, we found that superphosphoric acids with a wide range of $P_2O_5$ content could be used although we prefer to use acids with a range of about 74 to 80 percent $P_2O_5$, and most preferably 74 to 76 percent $P_2O_5$ acids that have the highest content of pyrophosphoric acid.

Using electric furnace superphosphoric acids with $P_2O_5$ contents ranging from about 74 to 76 percent, the initial ammoniation step is modified to preferentially precipitate and remove a significant portion of the orthophosphate present in the acid. In one alternative procedure, the acid is treated batchwise with water and gaseous ammonia to raise the pH to various values in the range of about 4 to 7.8 while maintaining the temperature below about 70° C.

In another alternative procedure, the first ammoniation step is terminated at about pH 5; the precipitate consists of 70 to 80 percent monoammonium orthophosphate and 20 to 30 percent diammonium pyrophosphate. In still another alternative procedure the initial ammoniation is terminated in the pH range 6.5 to 7.8; these intermediate precipitates consist of 60 to 90 percent ammonium orthophosphate, 5 to 35 percent ammonium pyrophosphates, and 0 to 5 percent ammonium tripolyphosphates. The precipitates formed at the various pH's are removed by filtration or by centrifuging and the moist solids are dried or granulated as described previously. The intermediate filtrates are then treated with anhydrous ammonia to raise the pH to about 8.5. The final precipitates, containing from about 19 to about 22 percent N and about 53 to about 59 percent $P_2O_5$, and consisting principally of $(NH_4)_2HPO_4$ and $(NH_4)_4P_2O_7$, are separated and dried or granulated and dried. The final filtrates, containing about half the $P_2O_5$ in the starting acid, will have a composition ranging from about 9 to about 12 percent N and from about 27 to about 34 percent $P_2O_5$ and may be used directly or processed as described above.

Although the quantity of water used in each of the alternative procedures may vary widely, we have found that the ammoniation reactions in both the initial and terminal stages are benefited, and the viscosity and the ratio of solid to solution in the slurries produced in the terminal stage are optimum when the total water added ranges from about 0.8 to 1.4 pounds per pound of $P_2O_5$ in the starting acid.

Referring now more specifically to FIG. 3, we have found also that the filterability of the slurries formed at the higher pH's is related to the temperature at which precipitation of the ammonium phosphates occurs. In our companion study of the system ammonia-pyrophosphoric acid-water at 0° and 25° C. [Farr, T. D., and Fleming, J. D., Journal of Chemical Engineering Data 10, 20-1 (1965)], we found (1) that anhydrous tetraammonium pyrophosphate is a stable saturating phase at 25° C., but is not a stable phase at 0° C., and (2) that tetraammonium pyrophosphate monohydrate is a stable saturating phase at both temperatures. The anhydrous form crystallizes as monoclinic tablets that filter poorly; the monohydrate crystallizes as monocline rods that filter readily. Both salts form when superphosphoric acids are ammoniated in the pH range about 7 to 8.5. In bench-scale tests of our process, tetraammonium pyrophosphate monohydrate was the predominant form when the terminal ammoniation stage was carried out at 20° C. or below; the precipitated phase, without exception, filtered satisfactorily. To illustrate, photomicrographs of precipitates formed at 2 temperature ranges are compared in FIG. 3. The precipitates that filtered readily were formed at 15° to 20° C.; the precipitates that filtered poorly were formed at the higher temperature range, 35° to 70° C.

In order that those skilled in the art may better understand how the present invention can be practiced, the following examples of specification applications are given by way of illustration but not by way of limitation. Bench-scale tests of the several methods described above were made batchwise or continuously with electric-furnace superphosphoric acids with $P_2O_5$ contents ranging from about 75 to about 83 percent. Tests also were made with wet-process acids that had been concentrated thermally to $P_2O_5$ contents of (1) about 71 percent from "black" commercial acid (about 52 percent $P_2O_5$) produced from uncalcined phosphate rock, and (2) about 74 percent from "green" commercial acid (about 52 percent $P_2O_5$) produced from calcined phosphate rock.

EXAMPLE I

In one test (AA-1) of Modification I of our process illustrated in FIG. 2, electric-furnace superphosphoric acid (77 percent $P_2O_5$), water, and ammonia were combined at about 70° C. to form a stock solution (LP-1) with pH 5.8. The solution contained 11.1 percent N and 37.6 percent $P_2O_5$, with the $P_2O_5$ distributed as ortho- 37, pyro- 46, tripoly- 15, and tetrapolyphosphate 2 percent. Part of the solution was then treated batchwise at 15° to 20° C. with anhydrous ammonia to produce a slurry with a pH of 8.5. The thick slurry (viscosity about 6000 cps.) was filtered under house vacuum (about 27 in.), the filtrate was recycled to weighed portions of stock solution LP-1, and then ammoniated as before to pH 8.5. The cycle was repeated three times. Each filtration was satisfactory (about 100 lb./hr./sq. ft.). The results, summarized in Table I below, shown that the four solid products, after drying in air at about 25° C. or in an oven at 660° C., were quite constant with respect to composition (N about 20.8 percent, $P_2O_5$ about 56.5 percent) and to phosphate distribution (ortho-, pyro-, and tripolyphosphates about 40, 50, and 10 percent, respectively). The four filtrates had similar compositions (N 11.2 to 11.5 percent, $P_2O_5$ 30.4 to 30.9 percent). The distribution of phosphate species in the filtrates also was quite constant in the various cycles.

TABLE I.—RECYCLING TEST (AA-1) WITH FERTILIZER SOLUTION 11-37-0

| | Cycle | | | |
|---|---|---|---|---|
| | I | II | III | IV |
| Input, grams $P_2O_5$: | | | | |
| In 11-37-0 (LP-1) | 111 | 63 | 68 | 54 |
| In filtrate (recycle) | 0 | 40 | 35 | 47 |
| Product, filtrate: | | | | |
| Weight, grams | 130 | 116 | 154 | 160 |
| $P_2O_5$, grams | 40 | 35 | 47 | 49 |
| Composition, percent: | | | | |
| N | 11.5 | 11.2 | 11.3 | 11.5 |
| $P_2O_5$ | 30.9 | 30.5 | 30.4 | 30.8 |
| $P_2O_5$ distribution, percent: | | | | |
| Ortho | 43 | 42 | 39 | 37 |
| Pyro | 32 | 29 | 40 | 32 |
| Tripoly | 22 | 24 | 20 | 30 |
| Tetrapoly | 3 | 6 | 2 | 2 |
| Solid: | | | | |
| Weight, grams | 114 | 84 | 79 | 82 |
| $P_2O_5$, grams | 64 | 56 | 45 | 45 |
| Composition, percent: | | | | |
| N | 20.9 | 20.9 | 20.7 | 20.6 |
| $P_2O_5$ | 56.4 | 56.3 | 57.0 | 55.4 |
| $P_2O_5$ distribution, percent: | | | | |
| Ortho | 34 | 41 | 41 | 42 |
| Pyro | 56 | 51 | 48 | 50 |
| Tripoly | 8 | 8 | 10 | 8 |
| Tetrapoly | 1 | 1 | 1 | 1 |
| Fraction, percent, of total $P_2O_5$: | | | | |
| In solid | 61.5 | 61.5 | 49 | 48 |
| In final filtrate | | | | 17 |

EXAMPLE II

In another test (AA-2) of Modification I illustrated in FIG. 2, electric-furnace superphosphoric acid (SA-1; 80 percent $P_2O_5$), water, and ammonia were combined as described in test AA-1 to form another stock solution (LP-12) with pH 5.9. Part of this solution was treated at 15° to 20° C. with anhydrous ammonia to produce a slurry at pH 8.6, and part of the thick slurry (12A-SL) was filtered under house vacuum.

Part of the filter cake was dried in air at about 25° C., crushed to pass a 12-mesh screen and the fines were mixed with the moist solids (12A-MS) in the ratio of 2 parts air-dried fines (12A-S) to 1 part wet solids (12A-MS). The moist granules then were dried at 66° C. to yield a granular product (12A-GS) with good physical properties and a composition corresponding to 8.8 pounds $NH_3$ per unit $P_2O_5$.

The filtrate (12A-L) contained 11.1 percent N and 31.2 percent $P_2O_5$; it could be recycled to the process as described in Example 1, used directly as liquid (product B), or upgraded for use as liquid (product C or D) as described in the specification and FIG. 2. In one test, part of the filtrate (12A-L) was treated with superphosphoric acid (SA-1; 80 percent $P_2O_5$) to lower the pH to 6; the fortified solution (product C, FIG. 2), which was stable at 0° C., contained 10.4 percent N and 34.9 percent $P_2O_5$ with the $P_2O_5$ distributed as ortho- 25, pyro- 30, tripoly- 33, tetrapoly- 9, and longer chain phosphates 3 percent. The composition and phosphate distribution of the stock solution (LP-12), the filtrate (12A-L) and the various solids are summarized in Table II below.

TABLE II.—COMPOSITION OF PRODUCTS OF FILTRATION PROCESS, MODIFICATION I

| Test | Material | Sample No. | Composition, percent | | $P_2O_5$ distribution, percent | | | | |
|---|---|---|---|---|---|---|---|---|---|
| | | | N | $P_2O_5$ | Ortho | Pyro | Tri | Tetra | Other |
| AA-2 | Stock soln | LP-12 | 11.1 | 36.7 | 31 | 40 | 20 | 7 | 3 |
| | Slurry [1] | 12A-SL | 14.1 | 35.2 | 30 | 40 | 19 | 7 | 3 |
| | Filtrate | 12A-L | 11.1 | 31.2 | 23 | 27 | 34 | 11 | 5 |
| | Moist solid | 12A-MS | 16.9 | 39.1 | 34 | 49 | 11 | 4 | 2 |
| | Dry solid [2] | 12A-S | 19.4 | 54.9 | 33 | 46 | 14 | 4 | 3 |
| | Granules | 12A-GS | 20.5 | 56.7 | 33 | 48 | 15 | 3 | 1 |
| AA-3 | Stock soln | LP-12 | 11.1 | 36.7 | 31 | 40 | 20 | 7 | 3 |
| | Slurry [3] | 11E-SL | 15.0 | 40.4 | 32 | 44 | 23 | 1 | |
| | Filtrate | 11E-L | 11.6 | 32.2 | 33 | 27 | 39 | 2 | |
| | Moist solid | 11E-MS | 17.2 | 45.4 | | | | | |
| | Dry solid [2] | 11E-S | 20.9 | 56.4 | 31 | 53 | 16 | | |
| | Granules | 11E-GS | 20.7 | 57.2 | 32 | 51 | 17 | | |

[1] Slurry prepared by batch ammoniation of solution LP-12 to pH 8.6 at 20° C.
[2] Recycle.
[3] Slurry prepared continuously at a pH about 8, and at a temperature about 70° C.

EXAMPLE III

In another test (AA-3) similar to test AA-2 described above, stock solution LP-12 was treated with anhydrous ammonia to produce continuously a slurry at pH about 8. No refrigeration was provided, and the temperature of the slurry was about 70° C. The slurry (11E-SL) was centrifuged, the solution phase (11E-L) was decanted and reserved, and the moist solids (11E-MS) then were granulated as described in test AA-2. The dry granules (11E-GS) had good physical properties and a composition corresponding to 8.8 lb. $NH_3$ per unit $P_2O_5$.

The composition and phosphate distribution of the various products of test AA-3 are compared with those of test AA-2 in Table II. These results show that the N and $P_2O_5$ contents and phosphate distribution of the products of both tests were quite similar, although the temperature at which the slurries were produced was significantly different in the two tests (70° C. in test AA-3; 15 to 20° C. in test AA-2). Thus, it is not necessary to remove by refrigeration the heat evolved in the precipitation reaction (vessel 12; FIG. 2) to produce granular ammonium polyphosphate with good physical properties and a high degree of ammoniation (about 8.8 lb. $NH_3$ per unit $P_2O_5$).

EXAMPLE IV

Additional tests of Modification I illustrated in FIG. 2 were made to determine whether the grade of the filtrates could be increased significantly by simple acidulation and reammoniation to produce solutions stable at 0° C. (product D; FIG. 2).

In the tests, superphosphoric acid No. 24 (77.4 percent $P_2O_5$) was ammoniated in two stages as described in Examples 1 and 2. The slurry at pH 8.4 was filtered and the filtrate was acidulated with acids No. 24 or No. 47 (79.6 percent $P_2O_5$) and reammoniated to various pH levels. The fortified solutions then were stored at 0° C. in stoppered bottles. After 3 days, the samples that contained no precipitate were seeded with a few grains of the solid phase (principally diammonium orthophosphate and tetraammonium pyrophosphate). After storage for 60 days, the composition of the unsaturated solutions were determined. These tests show that solutions stable at 0° C. with a composition of about 11 percent N and 39 percent $P_2O_5$ may be prepared by acidulating and reammoniating the filtrates that are produced in the process. The stable solutions prepared by acidulating the filtrates with superphosphoric acid No. 24 contained about 58 percent of its $P_2O_5$ in non-orthophosphate forms, whereas the solutions prepared by acidulating portions of the same filtrate with the more concentrated acid No. 47 contained about 65 percent of its $P_2O_5$ in nonorthophosphate forms. The results are summarized in Table III below.

TABLE III.—N-P SOLUTIONS [1] STABLE AT 0° C.

| | pH pattern | | Stable solutions | | | | | |
|---|---|---|---|---|---|---|---|---|
| | | | Composition, percent | | Distribution, percent, of $P_2O_5$ | | | |
| Acid added [2] | Reacidulation | Reammoniation | N | $P_2O_5$ | Ortho | Pyro | Tripoly | Tetrapoly | Other |
| 24 | 4.0 | 5.5 | 11.3 | 39.2 | 41 | 41 | 14 | 3 | 1 |
| | 4.5 | 5.5 | 10.5 | 38.0 | 42 | 40 | 14 | 3 | 1 |
| | 5.0 | 5.5 | 10.4 | 36.4 | 42 | 40 | 14 | 3 | 1 |
| | 5.0 | 6.2 | 11.2 | 35.9 | | | | | |
| 47 | 4.0 | 5.5 | 11.1 | 39.5 | 34 | 38 | 18 | 6 | 3 |
| | 4.5 | 5.5 | 10.7 | 38.3 | 35 | 39 | 18 | 6 | 3 |
| | 5.0 | 5.5 | 10.4 | 36.9 | 36 | 38 | 17 | 5 | 3 |
| | 5.0 | 6.2 | 11.4 | 36.5 | | | | | |

[1] The solutions were prepared for storage by adding superphosphoric acid and anhydrous ammonia to a solution phase (filtrate) obtained from the ammoniation of superphosphoric acid at atmospheric pressure to pH 8.4. The stock filtrate (24-E) contained 11.2 percent N and 29.2 percent $P_2O_5$, with the $P_2O_5$ distributed as ortho- 43, pyro- 40, and tripoly- and longer-chain phosphates combined 17 percent.
[2] Superphosphoric acid No. 24 contained 77.4 percent $P_2O_5$ distributed as ortho- 36, pyro- 46, tripoly- 14, and longer-chain phosphoric acids 4 percent; acid No. 47 contained 79.6 percent $P_2O_5$ distributed as ortho- 19, pyro- 42, tripoly- 21, tetrapoly- 10, pentapoly- 5, and longer-chain phosphoric acids 3 percent.

EXAMPLE V

Additional tests of Modification I were made using electric-furnace superphosphoric acids with $P_2O_5$ contents in the range of about 74 to 76 percent to determine the ammoniation conditions for preferential precipitation of the ortho- and pyrophosphate species.

In one series of tests, the superphosphoric acids were titrated with aqua ammonia (about 28 percent $NH_3$) to raise the pH to the range 4 to 5 while stirring and cooling. The amount of water added ranged from about 90 to 110 grams per 100 grams of $P_2O_5$ in the acid, and the reaction mixture was maintained in the temperature range 25° to 60° C. During this initial ammoniation step, needles of monoammonium orthophosphate and a very fine phase formed at pH about 2; further addition of aqua ammonia caused growth of the acicular crystals of $$NH_4H_2PO_4$$

but the fine phase did not reach sufficient size for petrographic identification. In the pH range 2 to 4, the precipitate was very difficult to filter. However, at about TABLE IV.—AMMONIATION OF SUPERPHOSPHORIC ACID
[Acid contained 75.2% $P_2O_5$, distributed as 52% ortho-, 34% pyro-, 13% longer-chain phosphates]

| | | Solid product | | | | | Filtrate | | | |
|---|---|---|---|---|---|---|---|---|---|---|
| | | Yield, percent of initial $P_2O_5$ | Compn. percent | | Distribution, percent, of $P_2O_5$ | | | Compn., percent | | Distribution, percent, of $P_2O_5$ | |
| | pH | | N | $P_2O_5$ | Ortho [2] | Pyro [3] | Other | N | $P_2O_5$ | Ortho | Pyro | Other |
| Test No.[1]: | | | | | | | | | | | |
| 1A | 4.5 | 42.0 | 12.5 | 62.5 | [4] 77 | [5] 23 | | | | 43 | 49 | 8 |
| 1B | 8.5 | 8.6 | 20.6 | 58.9 | 25 | 75 | | | | 51 | 39 | 10 |
| 2A | 6.8 | 20.9 | 20.8 | 54.1 | 93 | 6 | 1 | 11 | 33 | 47 | 48 | 6 |
| 2B | 8.5 | 17.4 | 21.3 | 55.2 | 54 | 42 | 4 | 11 | 30 | 52 | 40 | 8 |
| 3A | 7.2 | 24.4 | 20.8 | 54.3 | 85 | 15 | | | | 46 | 46 | 8 |
| 3B | 8.5 | 17.3 | 21.9 | 56.6 | 43 | 57 | | | | 46 | 37 | 17 |
| 4A | 7.6 | 29.4 | 20.9 | 54.5 | 80 | 20 | | 11 | 30 | 50 | 43 | 7 |
| 4B | 8.5 | 8.4 | 21.2 | 56.8 | 41 | 59 | | 11 | 28 | 52 | 40 | 8 |

[1] The first in each pair of entries represents the initial precipitation, the second represents the final precipitation.
[2] Present as diammonium orthophosphate.
[3] Present as tetraammonium pyrophosphate.
[4] Present as monoammonium orthophosphate.
[5] Present as diammonium pyrophosphate.

pH 4.5 most of the fine precipitate dissolved and a filterable product was produced; the solid phase contained about 40 percent of the $P_2O_5$ initially charged, distributed as monoammonium orthophosphate 70 to 80 percent and diammonium pyrophosphate 20 to 30 percent. The $P_2O_5$ in the filtrates was distributed as orthophosphate 35 to 50, pyrophosphate 35 to 50, and longer-chain phosphates about 1 to 15 percent. Further treatment of the filtrates with gaseous ammonia to pH about 8.5, while maintaining the temperature of the reaction mixture at 15 to 25° C., produced precipitates that contained about 10 percent of the $P_2O_5$ initially charged, distributed as diammonium orthophosphate 20 to 30, tetraammonium pyrophosphate 70 to 80, and ammonium tripolyphosphate 0 to 10 percent. The filtrates at pH about 8.5 contained about 50 percent of the $P_2O_5$ initially charged, distributed as orthophosphate 45 to 52, pyrophosphate 35 to 45, and longer-chain phosphates about 3 to 10 percent. Results of one test (1A and 1B) are summarized in Table IV on preceding page.

In other tests with these acids, the initial ammoniation step was carried out in the same manner as described above, except that the precipitates which formed at low pH's were not filtered off but were redissolved by further additions of aqua ammonia or gaseous ammonia to pH of about 5.5. Further treatment of these sodiate pH levels as 6.8, 7.2, and 7.6 produced precipitates that were removed without difficulty by filtration or centrifuging; they contained 15 to 37 percent of the $P_2O_5$ initially charged, distributed as diammonium orthophosphate 60 to 93, tetraammonium pyrophosphate 9 to 40, and ammonium tripolyphosphate 1 to 4 percent. The filtrates contained about 11 percent N and 30 to 33 percent $P_2O_5$, with the $P_2O_5$ distributed as orthophosphate 46 to 50, pyrophosphate 42 to 48, and longer-chain phosphate 2 to 12 percent. Further treatment of these filtrates with anhydrous ammonia to pH about 8.5 produced precipitates that contained 4 to 28 percent of the $P_2O_5$ initially charged, distributed as diammonium orthophosphate 40 to 55, tetraammonium pyrophosphate 40 to 60, and ammonium tripolyphosphate 0 to 8 percent. The filtrates contained about 11 percent N and 28 to 30 percent $P_2O_5$, with the $P_2O_5$ distributed as orthophosphate 42 to 52, pyrophosphate 36 to 46, and longer-chain phosphates 6 to 17 percent. Results of three tests (2A and 2B, 3A and 3B, 4A and 4B) are summarized in Table IV supra.

The results show that orthophosphate was precipitated preferentially as the monoammonium salt at pH 4 to 5 and as the diammonium salt at pH 6.8 to 8.5. Pyrophosphate was precipitated preferentially as the diammonium salt at pH 4 to 5 and as the tetraammonium salt at pH 6.8 to 8.5. Very little tripolyphosphate was found in the precipitates. Moreover, these results show that electric-furnace superphosphoric acid containing 74 to 76 percent $P_2O_5$ may be ammoniated under specified conditions to produce ammonium polyphosphates with various ratios of ortho- to pyrophosphate.

EXAMPLE VI

Other tests of Modification I were made to determine the effect of ammoniation temperature on the distribution of phosphate species in the slurries obtained at high pH. The starting solution in these tests was prepared from superphosphoric acid by the procedure shown schematically in FIG. 2; the distribution of phosphate species in this stock solution was essentially the same as that in the acid used. Portions of this stock solution (pH 6.1) were treated with anhydrous ammonia at different temperatures to form three batches of slurry at pH about 8.5. In tests 9A and 9B, the starting temperatures were 64° and 27° C., respectively, and no heat was removed intentionally from the insulated reaction vessel while ammoniating the solution from pH 6.1 to 8.4. In test 9C, the temperature was controlled in the range of 15° to 20° C., by cooling the reaction vessel in a chilled water bath.

The results, summarized in Table V below, show that ammoniation temperatures in the range likely to be encountered in plant-scale operation had no effect on the distribution of phosphate species in the slurries. In carrying out this step of our process, therefore, it is not necessary to have rigid temperature control during the second ammoniation step.

TABLE V.—EFFECT OF TEMPERATURE, EXAMPLE VI

|  | Starting acid | Starting solution | Ammoniated slurries | | |
| --- | --- | --- | --- | --- | --- |
|  |  |  | 9A | 9B | 9C |
| Ammoniation temp., ° C.: |  |  |  |  |  |
| Initial |  |  | 72 | 64 | 27 | 15 |
| Maximal |  |  | 72 | 64 | 54 | 20 |
| Terminal |  |  | 72 | 44 | 46 | 19 |
| Final pH |  |  | 6.1 | 8.4 | 8.4 | 8.5 |
| Composition, percent: |  |  |  |  |  |
| N |  |  | 11.3 | 14.2 | 13.5 | 13.7 |
| $P_2O_5$ |  | 79.6 | 37.6 | 38.8 | 37.4 | 36.2 |
| Distribution, percent, of $P_2O_5$: |  |  |  |  |  |
| Ortho | 21 | 23 | 25 | 24 | 23 |
| Pyro | 44 | 41 | 37 | 39 | 39 |
| Tripoly | 21 | 22 | 23 | 23 | 23 |
| Tetrapoly | 10 | 9 | 8 | 9 | 9 |
| Pentapoly | 3 | 4 | 3 | 3 | 3 |
| Other | 1 | 1 | 4 | 2 | 3 |

EXAMPLE VII

In another series of tests of Modification I, portions of a slurry were granulated and dried to determine the effect of drying temperature on the composition and distribution of phosphate species in the granular products.

The slurry was prepared by batch ammoniation of 600 grams of freshly prepared hot stock solution as described for test 9A in Example VI. The slurry was centrifuged, and the liquid and solid phases were granulated by the procedure described in Example II using three parts dry solid and one part liquid; the moist granules then were dried at 66°, 82°, or 105° C. In each test, three granulation and drying operations were necessary to reconstitute the starting slurry. The composition of the starting materials and the granular products are shown in Table VI below.

TABLE VI.—PREPARATION OF GRANULES, EXAMPLE VII

|  | Starting acid | Starting solution | Slurry 9A | Granulated products | | |
| --- | --- | --- | --- | --- | --- | --- |
|  |  |  |  | 9A-1 | 9A-2 | 9A-3 |
| Drying temp., ° C. |  |  |  | 66 | 82 | 105 |
| Composition, percent: |  |  |  |  |  |  |
| N |  | 11.3 | 14.2 | 18.7 | 18.2 | 18.5 |
| $P_2O_5$ | 79.6 | 37.6 | 38.8 | 59.0 | 59.5 | 59.1 |
| Free $H_2O$ |  |  |  | 0.4 | 0.6 | 0.6 |
| Distribution, percent, of $P_2O_5$: |  |  |  |  |  |  |
| Ortho | 21 | 23 | 25 | 25 | 27 | 37 |
| Pyro | 44 | 41 | 37 | 45 | 53 | 60 |
| Tripoly | 21 | 22 | 23 | 28 | 19 |  |
| Tetrapoly | 10 | 9 | 8 |  |  |  |
| Pentapoly | 3 | 4 | 3 |  |  |  |
| Other | 1 | 1 | 4 | 2 | 1 | 3 |

The results show that drying temperatures in the range 66° to 105° C. had no significant effect on the N and $P_2O_5$ contents of the granular products. The drying temperature, however, did affect significantly the distribution of phosphate species in the products. In the starting slurry, 38 percent of the $P_2O_5$ was present in phosphate forms more condensed than pyrophosphate. After granulation and drying at 66°, 82°, or 105° C., the $P_2O_5$ present in the more condensed forms was decreased to 30, 20, and 3 percent, respectively. Moreover the $P_2O_5$ present in the more desirable pyrophosphate form increased from 45 to 53 or to 60 percent when the drying temperature was raised from 66° to 82° or to 105° C., respectively.

While we have shown and described particular embodiments of our invention, modifications and variations thereof will occur to those skilled in the art. We wish it to be understood, therefore, that the appended claims are intended to cover such modifications and variations that are within the true scope and spirit of the invention.

What we claim as new and desire to secure by Letters Patent of the United States is:

1. An improved batchwise process for the production of solid and liquid ammonium polyphosphates which comprises the steps of:
at atmospheric pressure:
   (1) combining superphosphoric acid in the range from about 74 to 76 weight percent $P_2O_5$ and an aqueous ammoniating solution in proportions relative to one another to raise the pH of said superphosphoric acid to a range of about 4 to about 7.8 while simultaneously maintaining the temperature therein below about 70° C.;
   (2) withdrawing the resulting first slurry and separating the liquid phase from the solid phase therein;
   (3) subjecting the separated solid phase to drying and granulation operations and recovering therefrom a solid material containing by weight from about 12 to about 21 percent N and about 54 to about 63 percent $P_2O_5$ and comprising ammonium polyphosphates from the group consisting of ammonium orthophosphates, ammonium pyrophosphates, ammonium tripolyphosphates, and mixtures thereof;
   (4) recovering from said separating step the liquid phase and subsequently adding thereto anhydrous ammonia in quantity sufficient to raise the pH thereof to the range of about 8 to about 9;
   (5) withdrawing therefrom a second slurry and separating the liquid phase from the solid phase therein;
   (6) subjecting the separated solid phase to drying (temperature ranging from about 50° to about 110° C.) and granulation operations and recovering therefrom a solid material containing from about 19 to about 22 percent N and about 53 to about 59 percent $P_2O_5$ and consisting substantially of diammonium orthophosphate and tetraammonium pyrophosphate;
   (7) recovering from said second step the liquid phase which contains approximately one-half of the $P_2O_5$ values originally associated with the initial feed acid and containing by weight from about 9 percent to about 12 percent nitrogen and from about 27 percent to about 34 percent $P_2O_5$.

2. The process of claim 1 wherein the initial ammoniation step is terminated at a pH in the range of about 4 to 5 and wherein the solid phase from the first slurry consists essentially of about 70 to about 80 percent monoammonium orthophosphate and about 20 to about 30 percent diammonium pyrophosphate.

3. The process of claim 1 wherein the initial ammoniation step is terminated at a pH in the range of about 6.8 to about 7.6 and wherein the solid phase of said first precipitate consists essentially of about 60 to 93 percent ammonium orthophosphate, about 9 to 40 percent ammonium pyrophosphates and upwards to about 4 percent ammonium tripolyphosphates.

References Cited
UNITED STATES PATENTS

| 3,171,733 | 3/1965 | Hignett et al. | 71—48 |
| 3,243,279 | 3/1966 | Young | 71—43 |
| 3,375,063 | 3/1968 | Bookey et al. | 23—107 |
| 3,382,059 | 5/1968 | Getsinber | 71—34 |

OSCAR R. VERTIZ, Primary Examiner

G. A. HELLER, Assistant Examiner

U.S. Cl. X.R.

71—34, 43

PO-1050
(5/69)

UNITED STATES PATENT OFFICE
CERTIFICATE OF CORRECTION

Patent No. 3,533,737              Dated   October 13, 1970

Inventor(s)   Thad D. Farr and Julius D. Fleming

It is certified that error appears in the above-identified patent and that said Letters Patent are hereby corrected as shown below:

Column 6, line 39, change "90" to -- 95 --. Column 7, line 2, change "monocline" to -- monoclinic --; line 48, change "660°" to -- 66° --. Column 11, between lines 26 and 27, insert -- lutions with anhydrous ammonia to such interme- --

SIGNED AND
SEALED
DEC 15 1970

(SEAL)
Attest:

Edward M. Fletcher, Jr.
Attesting Officer

WILLIAM E. SCHUYLER, JR.
Commissioner of Patents